(12) United States Patent
Ueminami et al.

(10) Patent No.: US 7,015,828 B2
(45) Date of Patent: Mar. 21, 2006

(54) VEHICLE MONITORING APPARATUS

(75) Inventors: Keiji Ueminami, Okazaki (JP); Takashi Ue, Aichi (JP); Akihiro Kanaoka, Okazaki (JP)

(73) Assignee: Mitsubishi Jidosha Kogyo Kabushiki Kaisha, (JP)

( * ) Notice: Subject to any disclaimer, the term of this patent is extended or adjusted under 35 U.S.C. 154(b) by 119 days.

(21) Appl. No.: 10/822,216

(22) Filed: Apr. 9, 2004

(65) Prior Publication Data

US 2004/0257443 A1 Dec. 23, 2004

(30) Foreign Application Priority Data

Apr. 10, 2003 (JP) ............... 2003-106029

(51) Int. Cl.
*G08G 1/017* (2006.01)
(52) U.S. Cl. ............ 340/937; 340/441; 701/301; 348/148; 348/159
(58) Field of Classification Search ............ 340/937
See application file for complete search history.

(56) References Cited

U.S. PATENT DOCUMENTS

| 5,191,312 | A | * | 3/1993 | Altmann et al. ............ 340/441 |
| 5,680,123 | A | * | 10/1997 | Lee ............... 340/937 |
| 6,057,754 | A | * | 5/2000 | Kinoshita et al. ............ 340/937 |
| 6,327,536 | B1 | * | 12/2001 | Tsuji et al. ............... 340/435 |
| 6,330,511 | B1 | * | 12/2001 | Ogura et al. ............. 340/435 |
| 6,400,405 | B1 | * | 6/2002 | Tomida et al. ......... 348/333.05 |
| 6,594,583 | B1 | * | 7/2003 | Ogura et al. ............. 340/937 |
| 6,812,831 | B1 | * | 11/2004 | Ikeda ............... 340/937 |
| 6,847,873 | B1 | * | 1/2005 | Li ............... 340/438 |
| 2005/0012602 | A1 | * | 1/2005 | Knoop et al. ............. 340/435 |

FOREIGN PATENT DOCUMENTS

JP 2001-43494 A 2/2001

* cited by examiner

*Primary Examiner*—Jeffery Hofsass
*Assistant Examiner*—Eric Blount
(74) *Attorney, Agent, or Firm*—Rossi, Kimms & McDowell, LLP

(57) ABSTRACT

To display road situations on front left and front right sides of a vehicle, and so on without fail as a camera video image in an interior of the vehicle. In the case that a running speed of the vehicle is changed along an almost U-shaped line I as indicated by arrows, an image picked up by a vehicle-equipped camera is displayed on a monitor screen in the interior at a display starting speed Vd or less (an arrow B) and display of the monitor screen is executed surely at a speed Vmin or less (an arrow F) during the deceleration, while the display of the monitor screen is stopped at a non-displaying speed Vu or more (an arrow C) and the display of the monitor screen is stopped surely at a speed Vmax or more (an arrow E) during the acceleration.

16 Claims, 2 Drawing Sheets

VEHICLE MONITORING APPARATUS

BACKGROUND OF THE INVENTION

1. Field of the Invention

The present invention relates to a monitoring apparatus that picks up images of front left side and front right side road situations at a blind crossing, or the like by a vehicle-equipped camera and displays the image in the interior of the vehicle.

2. Description of the Related Art

It is desired that a speed Vd at which a video image picked up by a vehicle-equipped camera is started displaying in the interior of the vehicle is set high to some extent such that a passenger can see the camera video image as soon as possible at the moment when the driver decelerate the vehicle at the blind crossing, or the like to check safety of front left side and front right side road situations. In contrast, it is preferable that a speed Vu at which display of the camera video image is stopped is set as low as possible from aspects of practical use and safety at the moment when the driver accelerate the vehicle after the safety check of the road situations.

However, when the display starting speed Vd is set to be higher than the display stopping speed Vu, there is a possibility that the display of the camera video image is kept on depending upon driving situations of the vehicle.

For example, the camera video image is displayed on the monitor screen in the interior after the speed of the vehicle becomes the display starting speed Vd or less. In that moment, such a problem exists that, if the speed is increased once again before the speed is decreased lower than the display stopping speed Vu, the camera video image on the monitor screen does not disappear and is kept being displayed as it is even in such a situation that the speed has already been increased.

As a vehicle camera device, a device disclosed in Japanese Patent No. 3,287,817 is conventionally known.

SUMMARY OF THE INVENTION

The present invention intends to display road situations including a surrounding image of a vehicle as a camera video image in an interior of the vehicle without fail.

Therefore, a vehicle monitoring apparatus according to the present invention includes a camera mounted on a vehicle to pick up a surrounding image of the vehicle; and a monitor screen provided to an interior of the vehicle to display the image picked up by the camera; wherein the monitor screen is operated when the vehicle is decelerated to a first speed or less, an operation of the monitor screen is stopped when the vehicle is accelerated to a second speed or more that is lower than the first speed, and the operation of the monitor screen is stopped when the vehicle is accelerated to a third speed or more that is higher than the first speed while the monitor screen is operated.

In other words, when the vehicle is decelerated to the first speed or less, the monitor screen for displaying the image picked up by the vehicle-equipped camera is operated and thus the passenger can check quickly the safety of the road situations, etc., around the vehicle by the monitor screen. Also, when the vehicle is accelerated to the second speed or more that is lower than the first speed, the operation of the monitor screen which is unnecessary for the passenger can be stopped quickly. In addition, when the vehicle is accelerated to the third speed or more that is higher than the first speed, the operation of the monitor screen is stopped and thus elimination of the unnecessary display on the monitor screen can be attained without fail.

BRIEF DESCRIPTION OF THE DRAWING

These and other objects and advantages of this invention will become more fully apparent from the following detailed description taken with the accompanying drawings in which.

DETAILED DESCRIPTION OF THE PREFERRED EMBODIMENTS

An embodiment of the present invention will be described hereinafter.

Figure 1:
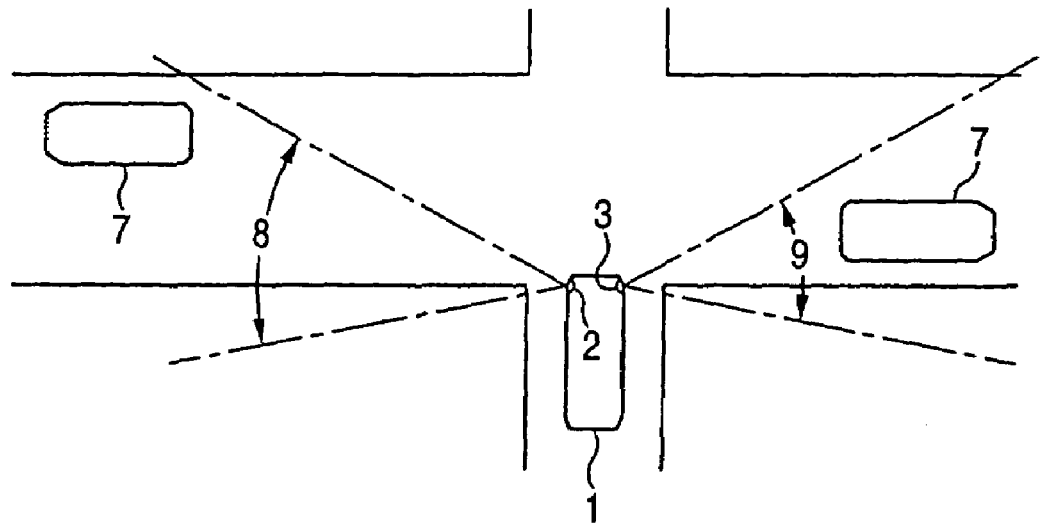
FIG. 1 is a schematic explanatory view of an embodiment of the present invention.
Figure 2:
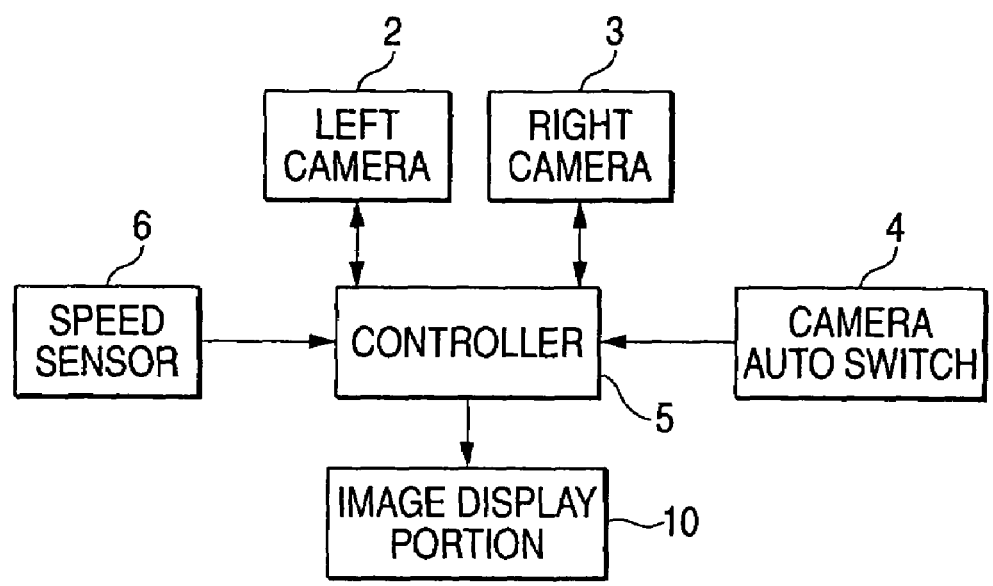
FIG. 2 is a configurative block diagram of the embodiment.

As mentioned above, it is desired that a speed Vd at which an video image picked up by a vehicle-equipped camera is started displaying in an interior of a vehicle is set high to some extent such that a passenger can see a camera video image as soon as possible at the moment when a driver decelerate the vehicle at a blind crossing, or the like to check safety of front left side and front right side road situations. In contrast, it is preferable that a speed Vu at which display of the camera video image is stopped is set as low as possible from aspects of practical use and safety at the moment when the driver accelerate the vehicle after the safety check of the road situations. In FIGS. 1 and 2, cameras 2, 3 are mounted on front left side and front right side of a vehicle 1 respectively. The cameras 2, 3 pick up images of visual fields 8, 9 containing another vehicle 7, etc., on the front left side and front right side of the vehicle 1 respectively. When a camera auto switch 4 is turned ON, a controller 5 controls operations of the cameras 2, 3, formation of the camera video image obtained by synthesizing appropriately video signals of both cameras 2, 3, and an operation of an image display portion 10 such as a navigation system, incorporated into the interior, in response to a speed signal received from a speed sensor 6.

Figure 3:
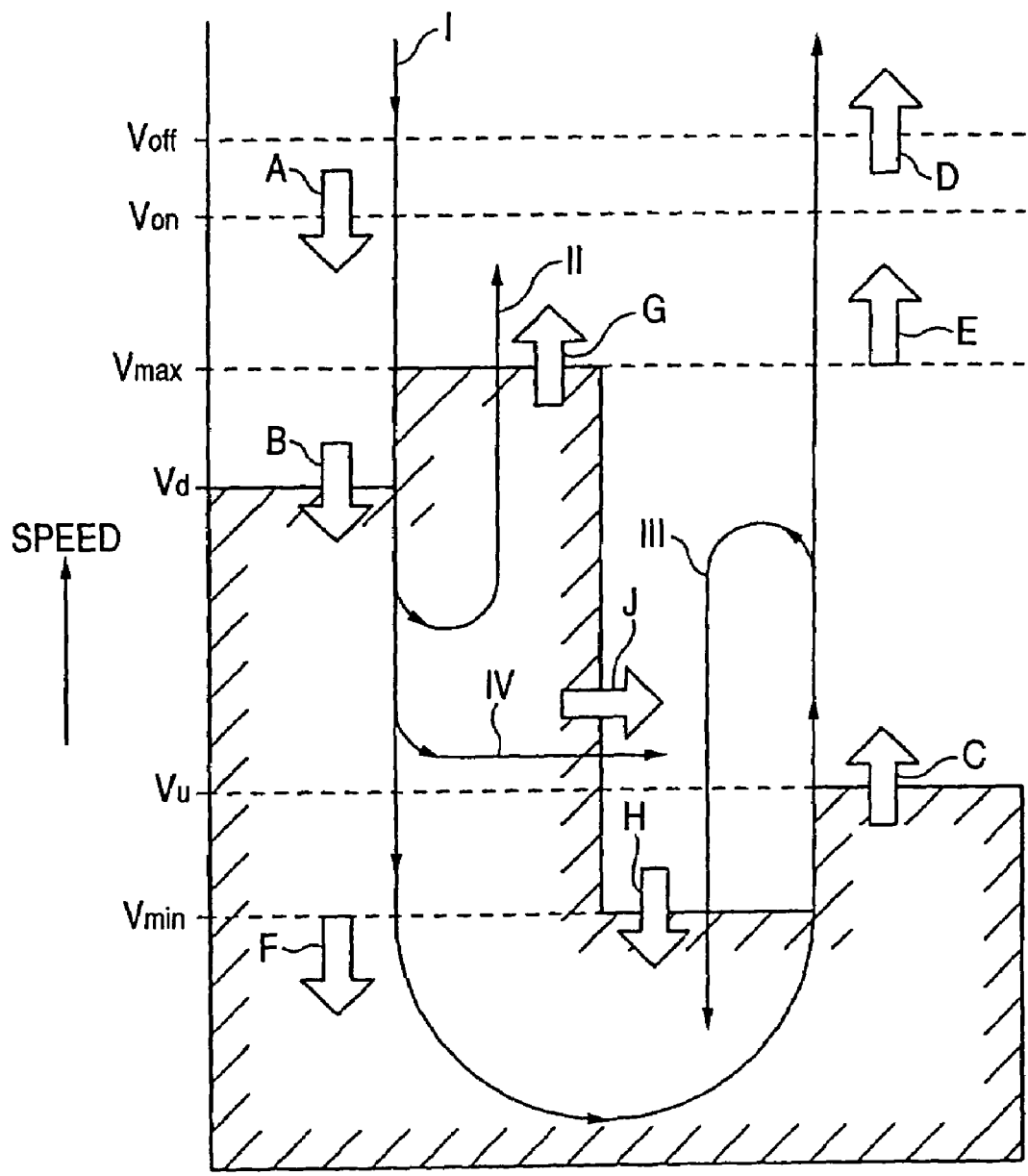
FIG. 3 is an operational conceptual view of the embodiment.

More particularly, as illustrated in FIG. 3, when the vehicle 1 changes a running speed along a line I as indicated with an arrow, the controller 5 operates as follows: (1) starts operations of the cameras 2, 3 at the moment when a running speed of the vehicle 1 is decreased and thus the vehicle 1 is decelerated to a speed Von or less (an arrow A), (2) starts displaying a synthesized video images of the front left side and front right side visual fields 8, 9 of the vehicle 1 picked up by the cameras 2, 3 on the image display portion 10 as the monitor screen when the running speed of the vehicle 1 is decreased further and thus the vehicle 1 is decelerated to a display starting speed Vd or less (an arrow B), (3) stops the display of the monitor screen on the image display portion 10 when the running speed of the vehicle 1 is then increased such that the vehicle 1 is accelerated to exceed a display stopping speed Vu that is lower than a display starting speed Vd after the vehicle 1 is stopped or comes to the speed that is close to the stop (an arrow C), (4) stops the operations of the cameras 2, 3 when the running speed of the vehicle 1 is further increased such that the vehicle 1 is accelerated to exceed a speed Voff that is higher than a speed Vmax being higher than the display starting speed Vd (an arrow D), (5) stops surely the display of the monitor screen on the image display portion 10 in a case when the vehicle 1 is accelerated to exceed the speed Vmax (an arrow E), (6) and causes the image display portion 10 to display the monitor screen surely when the vehicle 1 is decelerated smaller than a speed Vmin that is lower than the display stopping speed Vu (an arrow F), and (7) stops the display of the monitor screen when the display of the monitor screen on the image display portion 10 is kept for a predetermined time period, e.g., 2 to 5 seconds or more, preferably about 3 seconds or more while the vehicle 1 is running at a speed between the display starting speed Vd and the speed Vmin. As a result, the image display portion 10 displays the image only on a hatched portion of the monitor screen in FIG. 3.

Therefore, not only the passenger can look at the camera video image on the monitor screen quickly since the display starting speed Vd is set on or higher than the display stopping speed Vu and is relatively large, but also unnecessary camera video image can be erased quickly from the monitor screen when the vehicle 1 is accelerated after safety of the road situations, etc., is checked since the display stopping speed Vu is set to the display starting speed Vd or less and is relatively small. As a result, the driving of the vehicle 1 can be facilitated much more, and thus safety and practicality of the vehicle 1 can be improved remarkably.

Also, the speed Vmax at which display of the monitor screen on the image display portion 10 is stopped is set. Therefore, even though the decelerated vehicle 1 is accelerated once again along a line II that is branched from the line I between the display starting speed Vd and the display stopping speed Vu, the display of the monitor screen on the image display portion 10 is stopped at the moment when the speed is increased to exceed the speed Vmax (an arrow G). As a result, such a disadvantage can be eliminated that display of the unnecessary camera video image is still kept on the monitor screen as it is.

In addition, the speed Vmin at which the image display portion 10 is caused surely to display the monitor screen is set. Therefore, even though the speed is decreased once again along a line III that is branched from the line I in the situation that display of the monitor screen is being stopped because the vehicle 1 is in the middle of acceleration in excess of the display stopping speed Vu, the monitor screen is displayed without fail on the image display portion 10 when the speed is decreased to the speed Vmin or less (an arrow H). As a result, such a disadvantage can be eliminated that the necessary camera video image is not displayed on the monitor screen. The line III assumes a situation when the driver decelerates the vehicle much before the blind crossing, and then accelerates the speed of the vehicle appropriately toward the blind crossing before the vehicle is again decelerated nearly to stop at the blind crossing. In other words, it is not sure whether the driver can check safety of front left side and front right side road situations of the blind crossing even if the vehicle is decelerated nearly to stop.

Further, in a situation that the display of the monitor screen on the image display portion 10 is still kept for a predetermined time period when the vehicle 1 is between the display starting speed Vd and the speed Vmin, the display of the monitor screen is stopped when the speed is changed along a line IV that is branched from the line I (an arrow J). As a result, such a problem can be overcome that the unnecessary camera video image is displayed on the monitor screen.

Moreover, the subsequent display of the monitor screen can be stabilized easily by starting quickly the operations of the cameras 2, 3 at the moment when the running speed of the vehicle 1 is decreased and thus the vehicle 1 is decelerated below the speed Von that is higher than the display starting speed Vd (an arrow A). Also, the operations of the cameras 2, 3 can be stopped without fail, i.e., a power supplying time to the cameras 2, 3 can be suppressed as small as possible at the moment when the running speed of the vehicle 1 is increased and thus the vehicle 1 is accelerated to exceed the speed Voff that is higher than the speed Von (an arrow D).

The vehicle monitoring apparatus makes it possible not only to operate the cameras 2, 3 at an appropriate timing and also display the monitor screen on the image display portion 10 within the necessary limit but also to ensure the necessary display of the monitor screen and also eliminate the unnecessary display of the monitor screen. Therefore, a commodity value of the apparatus can be improved considerably as a whole.

In the above embodiment, the front left side and front right side visual fields 8, 9 of the vehicle 1 are picked up by the cameras 2, 3 respectively. However, it is possible to make it easy for the passenger to perceive the camera video image by displaying the camera video image relatively large on the monitor screen by following ways; any one of the front left side and front right side visual fields is picked up and the video image is displayed on the image display portion 10; only one camera for picking up any one of the front left side and front right side visual fields is incorporated in the vehicle and the video image is displayed on the image display portion 10; or only anyone of the front left and front right camera video images picked up by the cameras 2, 3 respectively is displayed on the image display portion 10.

Also, in the above embodiment, images of the front left and front right visual fields of the vehicle are picked up. However, the present invention can be similarly applied to the case that images of side and rear visual fields of the vehicle are picked up appropriately.

According to the vehicle monitoring apparatus of the present invention, the display of the monitor screen by the vehicle-equipped cameras can be executed within the necessary limit whereas the unnecessary display of the monitor screen can be eliminated. Therefore, the commodity value of this apparatus can be improved.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A vehicle monitoring apparatus comprising:
a camera mounted on a vehicle to pick up a surrounding image of the vehicle; and
a monitor screen provided to an interior of the vehicle to display the image picked up by the camera,
wherein the monitor screen is operated when the vehicle is decelerated to a first speed or less, an operation of the monitor screen is stopped when the vehicle is accelerated to a second speed or more that is lower than the first speed, and the operation of the monitor screen is stopped when the vehicle is accelerated to a third speed or more that is higher than the first speed during an operation of the monitor screen.

2. The vehicle monitoring apparatus according to claim 1, wherein after the operation of the monitor screen is stopped by accelerating the vehicle to the second speed or more, the monitor screen is operated when the vehicle is decelerated to a fourth speed or less that is lower than the second speed.

3. The vehicle monitoring apparatus according to claim 1, wherein the operation of the monitor screen is stopped when a running speed of the vehicle which is between the first speed and a fourth speed that is lower than the second speed is kept for a predetermined time period during the operation of the monitor screen.

4. The vehicle monitoring apparatus according to claim 1, wherein supply of a power to the camera is started automatically when the vehicle is decelerated to a fifth speed or less that is higher than the third speed.

5. The vehicle monitoring apparatus according to claim 1, wherein supply of a power to the camera is stopped automatically when the vehicle is accelerated to a sixth speed or more that is higher than the third speed.

6. The vehicle monitoring apparatus according to claim 1, wherein supply of a power to the camera is started automatically when the vehicle is decelerated to a fifth speed or less that is higher than the third speed, and supply of a power to the camera is stopped automatically when the vehicle is accelerated to a sixth speed or more that is higher than the fifth speed.

7. The vehicle monitoring apparatus according to claim 1, wherein the camera picks up images of front left side and front right side of the vehicle.

8. A vehicle monitoring apparatus comprising:
a camera mounted on a vehicle to pick up a surrounding image of the vehicle; and
a monitor screen provided to an interior of the vehicle to display the image picked up by the camera,
wherein the monitor screen is operated when the vehicle is decelerated to a first speed or less, an operation of the monitor screen is stopped when the vehicle is accelerated to a second speed or more that is lower than the first speed, and the monitor screen is operated when the vehicle is decelerated to a fourth speed or less that is lower than the second speed while an operation of the monitor screen is stopped by accelerating the vehicle to the second speed or more.

9. The vehicle monitoring apparatus according to claim 8, wherein the operation of the monitor screen is stopped when a running speed of the vehicle which is between the first speed and the fourth speed is kept for a predetermined time period during the operation of the monitor screen.

10. The vehicle monitoring apparatus according to claim 8, wherein supply of a power to the camera is started automatically when the vehicle is decelerated to a fifth speed or less that is higher than the first speed.

11. The vehicle monitoring apparatus according to claim 10, wherein supply of a power to the camera is stopped automatically when the vehicle is accelerated to a sixth speed or more that is higher than the fifth speed.

12. The vehicle monitoring apparatus comprising:
a camera mounted on a vehicle to pick up a surrounding image of the vehicle; and
a monitor screen provided to an interior of the vehicle to display the image picked up by the camera,
wherein the monitor screen is operated when the vehicle is decelerated to a first speed or less, an operation of the monitor screen is stopped when the vehicle is accelerated to a second speed or more from an area of the second speed or less that is lower than the first speed, and the operation of the monitor screen is stopped when the vehicle is accelerated to a third speed or more that is higher than the first speed before the speed reaches the second speed or less after the monitor screen is operated by decelerating the vehicle to the first speed or less.

13. The vehicle monitoring apparatus according to claim 12, wherein after the operation of the monitor screen is stopped by accelerating the vehicle to the second speed or more, the monitor screen is operated when the vehicle is decelerated to a forth speed or less that is lower than the second speed before the speed reaches the first speed or more.

14. A vehicle monitoring apparatus comprising:
a camera mounted on a vehicle to pick up a surrounding image of the vehicle; and
a monitor screen provided to an interior of the vehicle to display the image picked up by the camera,
wherein the monitor screen is operated when the vehicle is decelerated to a first speed or less, an operation of the monitor screen is stopped when the vehicle is accelerated to a second speed or more that is lower than the first speed, and the operation of the monitor screen is stopped when a running speed of the vehicle which is between the first speed and a fourth speed that is lower than the second speed is kept for a predetermined time period during the operation of the monitor screen.

15. The vehicle monitoring apparatus according to claim 14, wherein supply of a power to the camera is started automatically when the vehicle is decelerated to a fifth speed or less that is higher than the first speed.

16. The vehicle monitoring apparatus according to claim 15, wherein supply of a power to the camera is stopped automatically when the vehicle is accelerated to a sixth speed or more that is higher than the fifth speed.

* * * * *